(12) United States Patent
Rayzman et al.

(10) Patent No.: US 8,036,670 B2
(45) Date of Patent: Oct. 11, 2011

(54) METHOD AND APPARATUS FOR CONCURRENT WIMAX AND GSM OPERATION

(75) Inventors: Giora Rayzman, Rishon-LeZion (IL); Miri Ratner, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 11/648,203

(22) Filed: Dec. 29, 2006

(65) Prior Publication Data

US 2008/0161037 A1    Jul. 3, 2008

(51) Int. Cl.
*H04W 40/00* (2009.01)

(52) U.S. Cl. .......... 455/448; 455/127.4; 455/435.2; 455/437; 455/41.1; 370/338

(58) Field of Classification Search .......... 455/502, 455/127.4, 552.1, 555, 574, 435.2, 437, 448, 455/41.1, 553.1; 370/338
See application file for complete search history.

(56) References Cited

U.S. PATENT DOCUMENTS

| | | | |
|---|---|---|---|
| 5,732,076 A | 3/1998 | Ketseoglou et al. | |
| 2003/0080916 A1* | 5/2003 | Zeilinger et al. | 343/792 |
| 2003/0096624 A1* | 5/2003 | Ormson | 455/456 |
| 2006/0193295 A1 | 8/2006 | White et al. | |
| 2007/0140163 A1 | 6/2007 | Meier et al. | |
| 2008/0008156 A1 | 1/2008 | Kuehner | |
| 2008/0107047 A1* | 5/2008 | Olfat | 370/280 |

FOREIGN PATENT DOCUMENTS

| | | |
|---|---|---|
| CN | 101569106 A | 10/2009 |
| KR | 1020070041096 | 4/2007 |
| TW | 200830894 | 7/2008 |
| WO | WO-2008082863 A1 | 7/2008 |

OTHER PUBLICATIONS

Chauville, N. et al., "WiMax access over GSM/GPRS in rural areas", *Electron Devices for Microwave and optoelectronic Applications*, (Nov. 2004), 106-109.
"International Search Report and The Written Opinion", PCT/US2007/087035, (May 2, 2008), 11 Pages.
Office Action received for Korean Patent Application No. 10-2009-7013150, mailed on Dec. 31, 2010, 3 pages of Office action and 2 pages of English abstract.
International Preliminary Report on Patentability received for PCT Patent Application No. PCT/US2007/087035, mailed on Jul. 9, 2009, 7 pgs.

* cited by examiner

*Primary Examiner* — Jinsong Hu
*Assistant Examiner* — Quan M Hua
(74) *Attorney, Agent, or Firm* — Thorpe North & Western LLP

(57) ABSTRACT

Concurrent WIMAX and GSM operation is facilitated in a user device by coordinating for WiMAX absence periods during WiMAX frames that may conflict with corresponding GSM frames.

27 Claims, 4 Drawing Sheets

METHOD AND APPARATUS FOR CONCURRENT WIMAX AND GSM OPERATION

TECHNICAL FIELD

The invention relates generally to wireless communication and, more particularly, to techniques for allowing multiple wireless technologies to operate concurrently in a single device.

BACKGROUND OF THE INVENTION

Many modern communication devices support operation in multiple different wireless technologies. In many cases, it may be desirable to operate using two different wireless technologies at the same time. For example, a user of a device may wish to carry on a telephone conversation over a cellular wireless link at the same time that he is actively surfing the Internet. A problem that may arise with this concurrent operation is that one of the wireless technologies may interfere with the other. Such interference may occur even if the two wireless technologies operate within different frequency bands. For example, one of the wireless technologies may generate harmonics or other spurious frequency components during operation that are within the operational frequency band of the other wireless technology. Techniques are needed for reducing the amount of interference that may occur when two different wireless technologies are operating concurrently.

DETAILED DESCRIPTION

Figure 1:
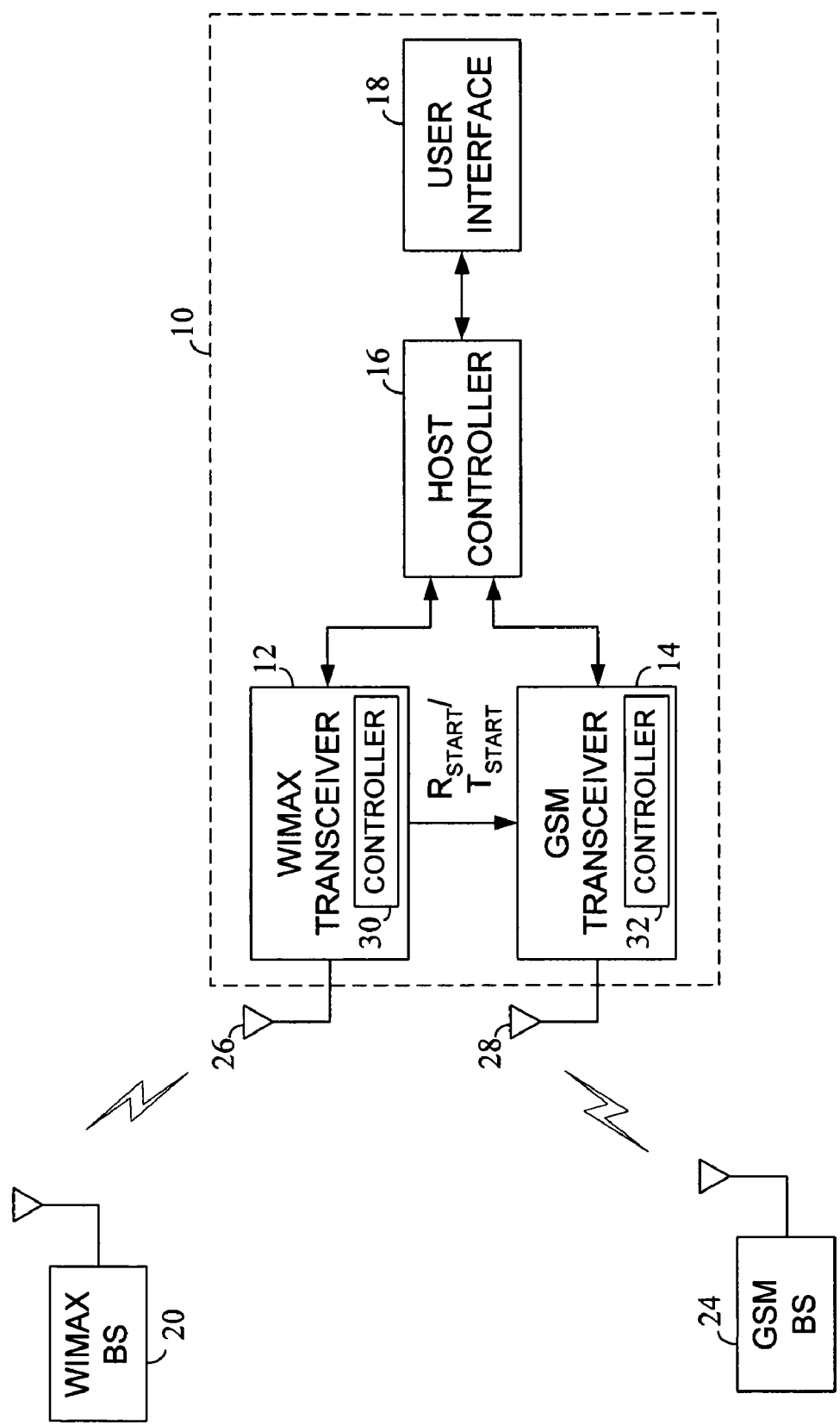
FIG. 1 is a block diagram illustrating a user device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example user device 10 in accordance with an embodiment of the present invention. As shown, the user device 10 may include: a GSM transceiver subsystem 12, a WiMAX transceiver subsystem 14, a host controller 16, and a user interface 18. The host controller 16 is operative for providing overall system control and other functions for the user device 10. The user interface 18 is operative for providing an interface between a user and the user device 10 and may include one or more of, for example, a keyboard, a keypad, a display, a pointing device, a speaker, a microphone, and/or others. The WiMAX transceiver 12 is operative for supporting wireless communication following the IEEE 802.16 wireless networking standard (and/or related standards). The WiMAX transceiver 12 may be part of a removable card, module, or board or it may be integral to the user device 10. During operation, the WiMAX transceiver 12 may communicate wirelessly with a remote WiMAX BS 20. The WiMAX BS 24 may provide access to one or more other networks including, for example, a private LAN, the Internet, and/or others. As shown, the WiMAX transceiver 12 may be coupled to one or more antennas 26 to facilitate transmission and reception of wireless signals. Any type of antenna(s) may be used including, for example, dipoles, patches, helical antennas, antenna arrays, and/or others. Multiple input/multiple output (MIMO) operation may also be supported.

The GSM transceiver 14 is operative for supporting cellular wireless communication following the Global System for Mobile Communications (GSM) standard (and/or related standards). The GSM transceiver 14 may be part of a removable card, module, or board or it may be integral to the user device 10. During operation, the GSM transceiver 14 may communicate wirelessly with a remote GSM base station (BS) 24 that allows the user to establish a voice connection to another party. As with the WiMAX transceiver 12, the GSM transceiver 14 may be coupled to one or more antennas 28 to facilitate transmission and reception of wireless signals. Any type of antennas may be used. The WiMAX transceiver 12 and the GSM transceiver 14 may each have a separate controller 30, 32 to control the operation thereof. The controllers 30, 32 may each include one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above.

If the WiMAX transceiver 12 and the GSM transceiver 14 are operating at the same time, interference may occur for one or both of the transceivers 12, 14 that can compromise the operation thereof. For example, the GSM transceiver 14 may generate harmonics that appear within the operational bandwidth of the WiMAX transceiver 12. These harmonics may be received by the WiMAX transceiver 12 at the same time that WiMAX signals are being received and thus reduce the WiMAX receiver's ability to accurately process the received WiMAX signals. The present invention relates to techniques that may be used to reduce or eliminate the occurrence of potentially harmful interference between the WiMAX transceiver 12 and the GSM transceiver 14 during concurrent operation.

In accordance with the GSM standard, communication between a GSM transceiver within a user device and a corresponding GSM BS may take place within successive frames each having a duration of 4.63 millisecond (ms). The WiMAX standard also provides for communication within a series of frames. The duration of the frames that is used in a particular WiMAX implementation may be selected from a predetermined group of available durations. It was determined that a frame duration could be selected for WiMAX operation so that an integer multiple of the WiMAX frame duration is equal to an integer multiple of the GSM frame duration. In this manner, a repeatable cycle may be established during concurrent operation within which the relationships between the WiMAX frames and the GSM frames repeat. This repeating cycle allows WiMAX frames to be identified that, if active, may result in interference in the system. Communication within these WiMAX frames may subsequently be avoided in each successive cycle to prevent the occurrence of such interference.

Figure 2:
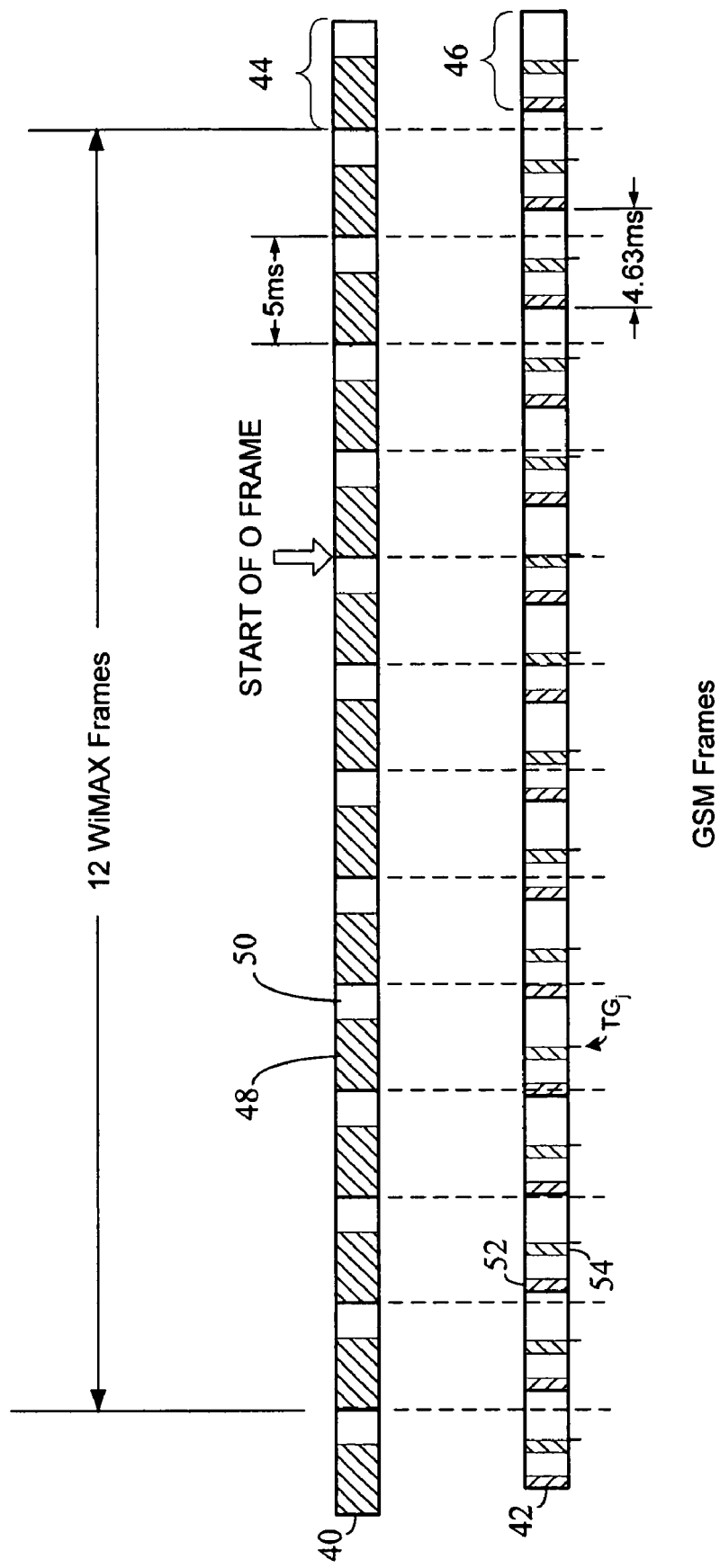
FIG. 2 is a timing diagram illustrating an example communication scenario involving GSM transceiver and WiMAX transceiver located within a common device in accordance with an embodiment of the present invention.

FIG. 2 is a timing diagram illustrating an example communication scenario involving a GSM transceiver and a WiMAX transceiver located within a common device in accordance with an embodiment of the present invention. The upper signal stream 40 in FIG. 2 represents communication between a plurality of WiMAX users (including a user device of interest) and a corresponding WiMAX base station. The lower signal stream 42 in FIG. 2 represents communication between a plurality of GSM users (including the user device if interest) and a corresponding GSM base station. As shown, the WiMAX communication is carried out in a series of WiMAX frames 44 each having a duration of 5 ms. Similarly, the GSM communication is carried out in a series of GSM frames 46 each having a duration of 4.63 ms. Based on these frame durations, 13 GSM frames will occur for every 12 WiMAX frames. Therefore, the same pattern of frames will repeat every 12 WiMAX frames for both the GSM and the WiMAX communication. This repeating frame pattern will be referred to herein as an "O frame."

Within each WiMAX frame 44, there is a downlink subframe 48 and an uplink subframe 50. During the downlink subframe 48, signals are transmitted from the WiMAX BS to the user devices being serviced thereby. This communication will utilize orthogonal frequency division multiple access (OFDMA) techniques to provide access for multiple different users within the corresponding cell. During the uplink subframe 50, signals are transmitted from the user devices within the WiMAX cell to the WiMAX BS. This uplink communication also utilizes OFDMA techniques. Each downlink subframe 48 will typically include MAP information at a beginning thereof that describes the specific portion of the downlink subframe 48 and the corresponding uplink subframe 50 that is to be used by each active user device within the corresponding WiMAX cell. Each user device within the cell reads this MAP information and then knows when, and in what subcarriers, it will receive data and when, and in what subcarriers, it can transmit data.

Each GSM frame 46 may be divided into 8 time slots, with each time slot having a duration of 577 microseconds (µs). In a typical arrangement, the first time slot within each GSM frame 46 will be a receive time slot during which the user device of interest will receive a voice signal from the GSM BS. The fourth time slot within each GSM frame 46 will be a transmit time slot during which the user device will transmit a voice signal to the GSM BS (as part of the same voice call). The user device reassembles the voice signals received via the successive receive time slots to generate an audible voice signal for the user to listen to.

Typically, the WiMAX BS and the GSM BS will operate independently of one another. Therefore, there will be no time synchronization between the BSs and the frames in the two streams may be randomly aligned in time. The GSM transceiver within the user device of interest may generate a signal to identify the beginning of the corresponding GSM receive time slot and/or a signal to identify the beginning of the corresponding GSM transmit time slot. These signals will be referred to herein as $R_{START}$ and $T_{START}$, respectively. In at least one embodiment of the invention, an existing signal can be used as the $T_{START}$ or $R_{START}$ signal without having to modify the GSM transceiver (e.g., the TX/RX indicator between the GSM baseband section and the radio frequency front-end (RFFE), etc.). In some embodiments of the invention, the $T_{START}$ or $R_{START}$ signal may be delivered from the GSM transceiver 14 to the WiMAX transceiver 12 within the user device of interest for use in interference avoidance measures.

When the WiMAX transceiver 12 receives the $T_{START}$ or $R_{START}$ signal (or a similar timing signal), it may use the signal to define the beginning of the O frame. In one approach, a parameter $delta_{i,j}$ may be defined that represents the difference between the beginning of WiMAX frame i and the end of the GSM transmit slot within GSM frame j (i.e., $W_i - TG_j$). The WiMAX transceiver 12 knows the timing of its own frames and determines the timing of the GSM frames from the $T_{START}$ or $R_{START}$ signal. The WiMAX transceiver uses the timing information to identify the $delta_{i,j}$ having the smallest absolute value within a run of 12 consecutive WiMAX frames. This determination can be made by calculation, knowing the repetitive nature of the 60 ms cycle. That is, it is not necessary to wait for a full cycle to complete before determining the smallest $|delta_{i,j}|$. In at least one implementation, the calculation is performed within 5 ms of detection of the first $T_{START}$ or $R_{START}$ signal within the WiMAX transceiver. Once the smallest $|delta_{i,j}|$ has been found, the beginning of the O frame cycle is set to the beginning of the WiMAX frame that corresponds to the identified value. As stated previously, in at least one implementation, the O frame cycle includes 12 WiMAX frames and 13 GSM frames and repeats itself every 60 ms.

After the O frame has been established, the WiMAX transceiver 12 may then determine which WiMAX frames in the O frame may conflict with transmit or receive activity of the GSM voice call. As stated previously, the transmissions of the GSM transceiver 14 may have harmonic frequency components within the operational frequency band of the WiMAX transceiver 12. Therefore, the WiMAX transceiver 12 may first identify WiMAX frames within the O frame where a GSM transmit time slot overlaps a WiMAX downlink subframe. In some circumstances, wireless transmissions from the WiMAX transceiver may potentially create interference within the receiver of the GSM transceiver. If this is a possibility, the WiMAX transceiver 12 may also identify WiMAX frames within the O frame where a GSM receive slot overlaps a WiMAX uplink sub-frame. After WiMAX frames have been identified that might result in a conflict, the WiMAX transceiver 12 may coordinate with the WiMAX base station 20 to establish "absence" periods (i.e., orderly absence) during these identified WiMAX frames so that no WiMAX communication activity takes place between the user device of interest and the WiMAX BS during these frames. The other frames within the O frame will be "active" frames that permit communication between the user device of interest and the WiMAX BS. In at least one embodiment, the WiMAX transceiver 12 will go into a power save mode (e.g., a sleep mode, etc.) during the defined absence periods to conserve energy, although this is not a requirement.

After the absence frames and active frames have been defined, the WiMAX transceiver 12 within the user device of interest will operate within the active frames for each subsequent O frame cycle. This may continue until, for example, the GSM voice call terminates or some other termination event occurs. In one approach, for example, the WiMAX transceiver 12 may assume that the GSM voice call has ended if a predetermined amount of time elapses since a $T_{START}$ or $R_{START}$ signal has been received. If this occurs, the WiMAX transceiver 12 may coordinate with the WiMAX BS to return to a normal WiMAX transmission mode (e.g., using all available WiMAX frames).

If the WiMAX transceiver 12 is allowed to operate within the active frames of the repeating O frame cycle for a very long period, timing differences between the WiMAX clock and the GSM clock may eventually lead to a situation where the absence periods and the active periods are no longer optimal. Therefore, in at least one embodiment of the invention, occasional or periodic recalibrations of the O frame cycle may be performed. For example, in one approach, if more than a predetermined number of O frame cycles have occurred without a termination event (or a predetermined amount of time has passed), the process of determining the beginning of the O frame cycle and identifying and setting up the absence frames and active frames may be repeated. The timing of the recalibration may be selected based on, for example, a worst case clock error scenario.

Different mechanisms may be used to realize the orderly absence from the WiMAX network. In some embodiments, mechanisms that are already available within the WiMAX standard may be used to provide orderly absence from the network for the user device of interest. For example, in one approach, the periodic power save functionality provided for in the WiMAX standard is taken advantage of to provide the orderly absence from the network. In another approach, the periodic scan capabilities from the WiMAX standard are used to provide orderly absence. Other mechanisms may alternatively be used. New mechanisms/protocols can also be developed to provide for the orderly absence from the network.

In the description above, most of the actions and calculations involved in defining the O frame and setting up the absence frames and active frames for WiMAX operation are described as being carried out within the WiMAX transceiver of the user device of interest. It should be appreciated that other locations may alternatively be used. For example, some or all of these actions may be carried out within the host controller or the GSM transceiver of the user device of interest.

Figure 3:
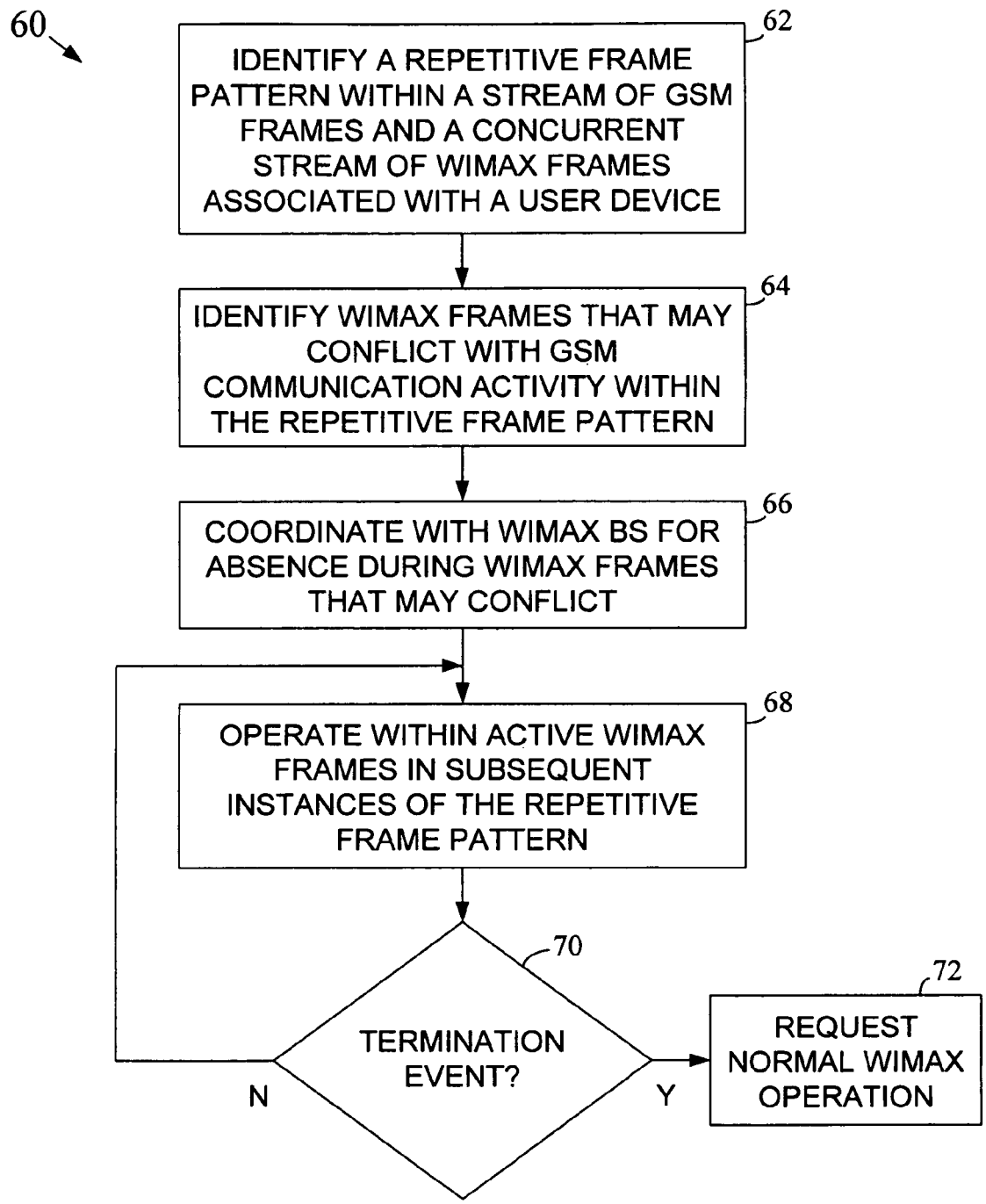
FIG. 3 is a flowchart illustrating a method for providing for concurrent operation between a WiMAX transceiver and a GSM transceiver within a user device in accordance with an embodiment of the present invention.

FIG. 3 is a flowchart illustrating an example method 60 for supporting concurrent operation between a WiMAX transceiver and a GSM transceiver within a user device in accordance with an embodiment of the present invention. The method 60 may be practiced within, for example, the user device 10 of FIG. 1 or in other devices or systems. First, a repetitive frame pattern (e.g., an O frame) is identified within a stream of GSM frames and a concurrent stream of WiMAX frames associated with a user device (block 62). WiMAX frames are then identified within the repetitive frame pattern that may conflict with GSM communication activity (block 66). For example, WiMAX frames that have a downlink subframe that overlaps, in time, a GSM transmit slot may be identified as WiMAX frames that may conflict with GSM communication activity. Similarly, WiMAX frames that have an uplink subframe that overlaps, in time, a GSM receive slot may also be identified as WiMAX frames that may conflict with GSM communication activity.

After WiMAX frames have been identified, the user device of interest may coordinate with the WiMAX base station so that no communication activity is scheduled for the user device of interest (i.e., absence) during the identified frames (block 66). Any of a plurality of different mechanisms may be used to provide for absence from the network during these frames in various embodiments. In the O frames that follow, the WiMAX communication will be carried out only in the active WiMAX frames (block 68). There will be no WiMAX communication activity within the absence frames for the user device of interest. In at least one embodiment, the WiMAX transceiver within the user device of interest will be placed in power save mode of operation (e.g., sleep mode, etc.) during the absence frames, to conserve energy. The WiMAX communication will continue within the active frames of the repeating O frame until a termination event is detected (block 70). The termination event may include, for example, the detection of the termination of the GSM call and/or some other event. In one embodiment, the end of the GSM call is detected when it is found that a predetermined amount of time has passed since a $T_{START}$ or $R_{START}$ signal (or other GSM timing signal) has been received from the GSM transceiver.

When a termination event is detected, the user device of interest may coordinate with the WiMAX BS to resume normal WiMAX operation (block 72). In at least one embodiment, the method 60 may return to block 62 if a predetermined amount of time elapses before a termination event is detected in block 70. In this manner, the repetitive frame pattern may be re-established and the absence frames and active frames may be reevaluated based on current conditions.

Figure 4:
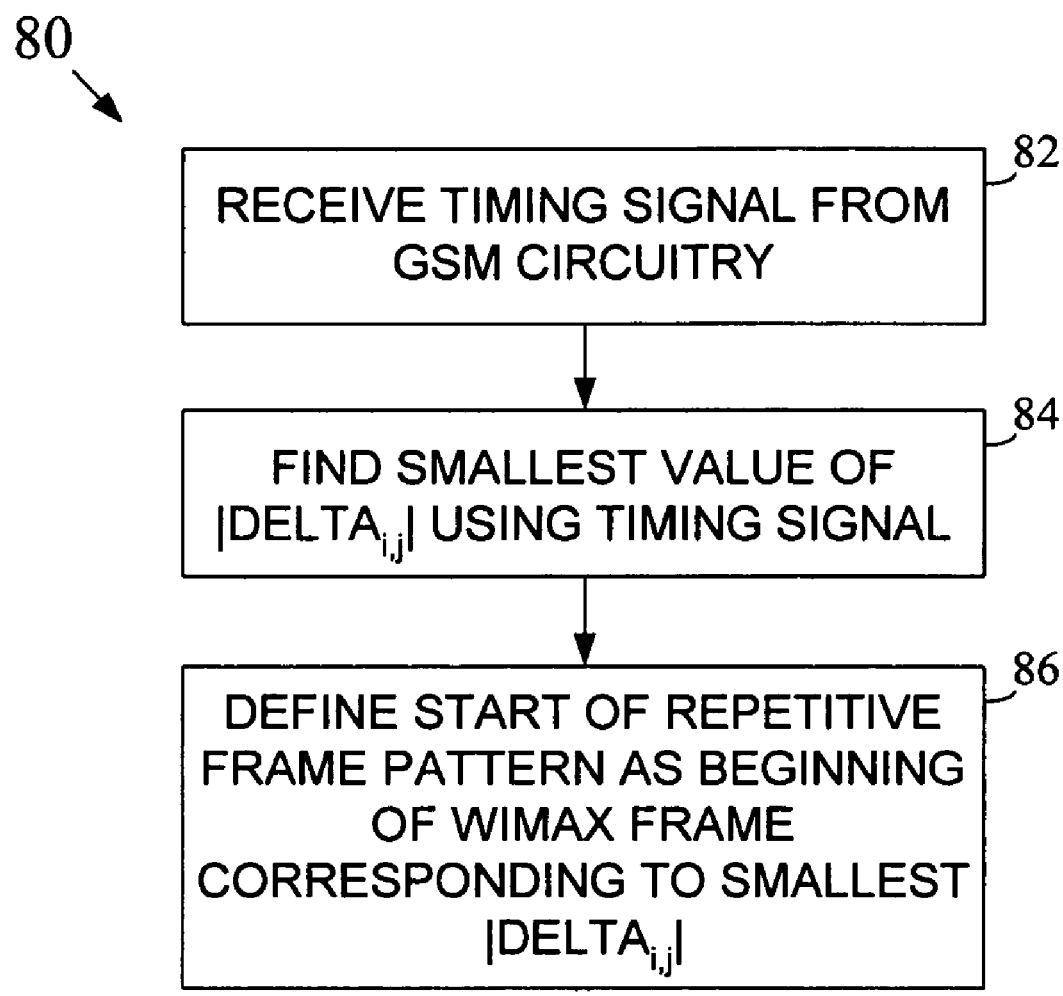
FIG. 4 is a flowchart illustrating an example method for identifying a repetitive frame pattern for a stream of GSM frames and a stream of WiMAX frames in accordance with an embodiment of the present invention.

FIG. 4 is a flowchart illustrating an example method 80 for identifying a repetitive frame pattern for a stream of GSM frames and a stream of WiMAX frames in accordance with an embodiment of the present invention. First, a timing signal (e.g., $T_{START}$, $R_{START}$, etc.) is received from a GSM transceiver that is indicative of the timing of the GSM transmit slot and/or receive slot of a GSM voice communication (block 82). The timing signal is then used find the smallest value of the parameter |$delta_{i,j}$|, as described above (block 84). The beginning of the WiMAX frame corresponding to the smallest |$delta_{i,j}$| is then defined as the start of the repetitive frame pattern (block 86).

In the embodiments described above, the O frame is described as spanning 12 successive WiMAX frames and 13 successive GSM frames. Other frame combinations may alternatively be used where an integer number of WiMAX frames has the same duration as a different integer number of GSM frames. It should be appreciated that the inventive techniques may also be used with other wireless technologies that communicate using a stream of frames.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for concurrent WiMAX and GSM operation at a user device comprising:
   identifying a repetitive frame pattern within a stream of GSM frames and a concurrent stream of WiMAX frames at a user device;
   identifying WiMAX frames within said repetitive frame pattern that, if active for said user device, may conflict with GSM communication activity of said user device; and
   coordinating by said user device with a WiMAX base station for absence from a WiMAX network for said user device during said WiMAX frames in said repetitive frame pattern that may conflict.

2. The method of claim 1, further comprising:
   communicating with said WiMAX base station within WiMAX frames other than said WiMAX frames that may conflict within subsequent instances of said repetitive frame pattern.

3. The method of claim 2, further comprising:
   coordinating with said WiMAX base station to resume normal WiMAX operation when a termination event is detected.

4. The method of claim 3, wherein:
   said termination event includes a termination of a current GSM call.

5. The method of claim 1, wherein:
   identifying WiMAX frames that may conflict with GSM communication activity includes identifying WiMAX frames having a downlink subframe that overlaps, in time, a transmit slot of a GSM frame.

6. The method of claim 1, wherein:
   identifying WiMAX frames that may conflict with GSM communication activity includes identifying WiMAX frames having an uplink subframe that overlaps, in time, a receive slot of a GSM frame.

7. The method of claim 1, wherein:
   identifying a repetitive frame pattern includes defining a starting point of said repetitive frame pattern.

8. The method of claim 7, wherein:
   defining a starting point of said repetitive frame pattern include identifying a WiMAX frame that results is a smallest value of $|delta._{i,j}|$, where $delta._{i,j}$ is the time difference between the beginning of WiMAX frame i and the end of the transmit slot of GSM frame j.

9. The method of claim 1, wherein:
   said repetitive frame pattern has a duration that is equal to the duration of M successive WiMAX frames and equal to the duration of N successive GSM frames, where M and N are integers.

10. The method of claim 9, wherein M is 12 and N is 13.

11. The method of claim 1, wherein:
    coordinating with a WiMAX base station for absence from a WiMAX network includes sending an absence request message to said WiMAX base station to request absence.

12. The method of claim 1, wherein:
    coordinating with a WiMAX base station for absence from a WiMAX network includes using a periodic power save function to provide for absence from said WiMAX network.

13. The method of claim 1, wherein:
    coordinating with a WiMAX base station for absence from a WiMAX network includes using a periodic scan function to provide for absence from said WiMAX network.

14. An apparatus for concurrent WiMAX and GSM operation comprising:
    a GSM transceiver to support wireless communication with a GSM base station from the apparatus;
    a WiMAX transceiver to support wireless communication with a WiMAX base station from the apparatus; and
    a controller to facilitate concurrent operation of said GSM transceiver and said WiMAX transceiver, said controller to: identify a repetitive frame pattern within a stream of GSM frames and a concurrent stream of WiMAX frames at the apparatus; identify WiMAX frames within said repetitive frame pattern that, if active for said apparatus, may conflict with GSM communication activity of said GSM transceiver; and coordinate with a WiMAX base station for absence from a WiMAX network for said apparatus during said WiMAX frames in said repetitive frame pattern that may conflict.

15. The apparatus of claim 14, wherein:
    said WiMAX transceiver communicates with said WiMAX base station within WiMAX frames other than said WiMAX frames that may conflict, within subsequent instances of said repetitive frame pattern.

16. The apparatus of claim 15, wherein:
    said WiMAX transceiver coordinates with said WiMAX base station to resume normal WiMAX operation when a termination of a current GSM call is detected.

17. The apparatus of claim 14, wherein:
    said controller identifies WiMAX frames that may conflict with GSM communication activity by identifying WiMAX frames within said repetitive frame pattern that have a downlink subframe that overlaps, in time, a transmit slot of a GSM frame.

18. The apparatus of claim 17, wherein:
    said controller identifies WiMAX frames that may conflict with GSM communication activity by identifying WiMAX frames within said repetitive frame pattern that have an uplink subframe that overlaps, in time, a receive slot of a GSM frame.

19. The apparatus of claim 14, wherein:
    said controller coordinates with said WiMAX base station to use a periodic power save function to provide for absence from said WiMAX network.

20. The apparatus of claim 14, wherein:
said controller coordinates with said WiMAX base station to use a periodic scan function to provide for absence from said WiMAX network.

21. The apparatus of claim 14, wherein:
said controller is part of said WiMAX transceiver.

22. An article for concurrent WiMAX and GSM operation at a user device comprising a computer readable storage medium having instructions stored thereon that, when executed by a computing platform on a user device, operate to:
identify a repetitive frame pattern within a stream of GSM frames and a concurrent stream of WiMAX frames at a user device;
identify WiMAX frames within said repetitive frame pattern that, if active for said user device, may conflict with GSM communication activity of said user device; and
coordinate by said user device with a WiMAX base station for absence from a WiMAX network for said user device during said WiMAX frames in said repetitive frame pattern that may conflict.

23. The article of claim 22, wherein:
operation to identify WiMAX frames that may conflict with GSM communication activity includes operation to identify WiMAX frames having a downlink subframe that overlaps, in time, a transmit slot of a GSM frame.

24. The article of claim 23, wherein:
operation to identify WiMAX frames that may conflict with GSM communication activity includes operation to identify WiMAX frames having an uplink subframe that overlaps, in time, a receive slot of a GSM frame.

25. A system for concurrent WiMAX and GSM operation comprising:
a dipole antenna;
a GSM transceiver, coupled to said dipole antenna, to support wireless communication with a GSM base station from the system;
a WiMAX transceiver to support wireless communication with a WiMAX base station from the system; and
a controller to facilitate concurrent operation of said GSM transceiver and said WiMAX transceiver, said controller to: identify a repetitive frame pattern within a stream of GSM frames and a stream of WiMAX frames at the system; identify WiMAX frames within said repetitive frame pattern that, if active for said system, may conflict with GSM communication activity of said GSM transceiver; and coordinate with a WiMAX base station for absence from a WiMAX network for said system during said WiMAX frames in said repetitive frame pattern that may conflict.

26. The system of claim 25, wherein:
said controller identifies WiMAX frames that may conflict with GSM communication activity by identifying WiMAX frames within said repetitive frame pattern that have a downlink subframe that overlaps, in time, a transmit slot of a GSM frame.

27. The system of claim 25, wherein:
said controller identifies WiMAX frames that may conflict with GSM communication activity by identifying WiMAX frames within said repetitive frame pattern that have an uplink subframe that overlaps, in time, a receive slot of a GSM frame.

* * * * *